S. W. TATE.
CLAMP.
APPLICATION FILED APR. 9, 1914.
1,130,772.
Patented Mar. 9, 1915.
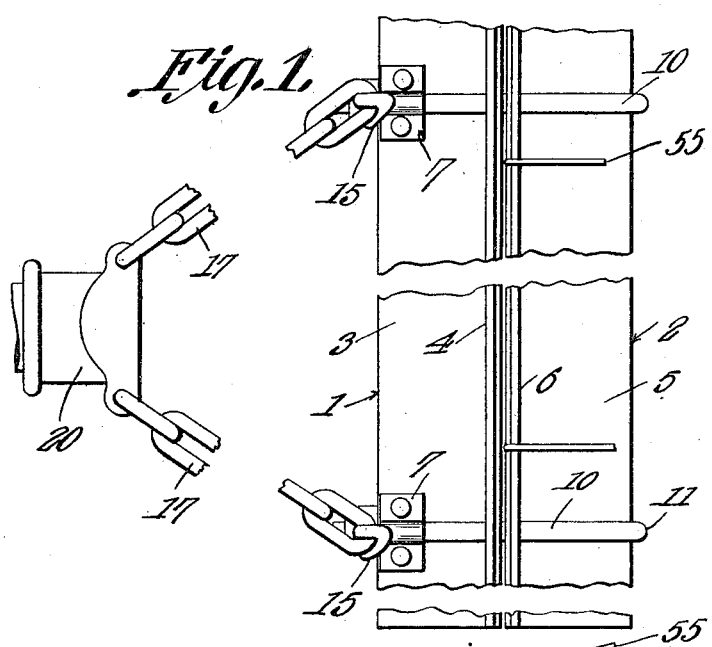
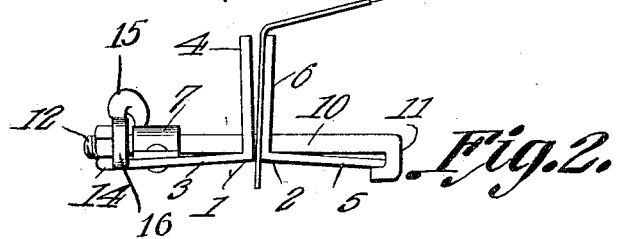
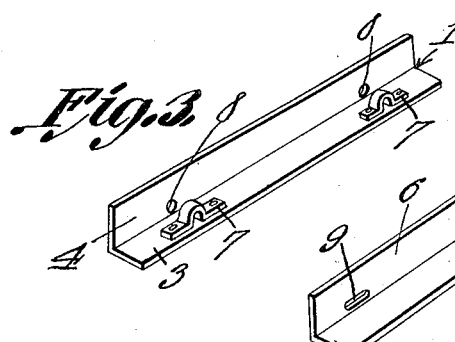
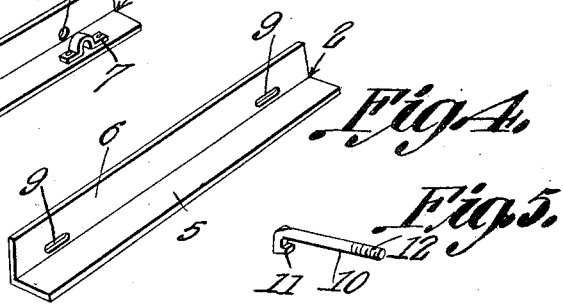
Witnesses
Samuel W. Tate, Inventor
by C. A. Snow & Co.
Attorneys

UNITED STATES PATENT OFFICE.

SAMUEL W. TATE, OF PARMA, IDAHO.

CLAMP.

1,130,772.  Specification of Letters Patent.  Patented Mar. 9, 1915.

Original application filed September 10, 1913, Serial No. 789,120. Divided and this application filed April 9, 1914. Serial No. 830,742.

*To all whom it may concern:*

Be it known that I, SAMUEL W. TATE, a citizen of the United States, residing at Parma, in the county of Canyon and State of Idaho, have invented a new and useful Clamp, of which the following is a specification.

The device forming the subject matter of this application is a clamp and the present application discloses matter divided out of my co-pending application No. 789,120, filed Sept. 10, 1913.

The present invention aims to provide a clamp of simple construction and automatically acting to engage a wire or fence with a strong grip.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 shows the invention in side elevation, parts being broken away; Fig. 2 is a top plan, portions being removed; Fig. 3 is a perspective view depicting one of the angle members; Fig. 4 is a perspective view depicting the other of the angle members; Fig. 5 is a perspective view showing the connecting element; Fig. 6 is a perspective view showing the attaching hook.

In carrying out the present invention there is provided a clamp comprising angle bars 1 and 2, the flanges of the angle bar 1 being denoted by the numerals 3 and 4 and the flanges of the angle bar 2 being denoted by the numerals 5 and 6. The flange 3 of the angle bar is provided with spaced bearings 7 and in the flange 4 of the angle bar 1, opposite to the bearing 7 are openings 8. In the flange 6 of the angle bar 2 there are elongated slots 9. The flanges 4 and 6 of the respective angle bars are placed opposite to each other as shown in the drawings, the flanges 3 and 5 extending in opposite directions. Securing members 10 are mounted in the bearings 7, the securing members terminating in hooks 11 engaged around the flange 5 of the angle bar 2, the securing elements 10 passing through the openings 8 and 9, the openings 9 permitting the passage of the hooks 11. One end, of each securing members 10 is threaded as indicated at 12 to receive a nut 14. Ram's horn hooks 15 are provided, the same having eyes 16 which surround the securing elements 10, between the nuts 14 and the flange 3. Chains 17 or other flexible elements are engaged with the ram's horn hooks 15, the chains 17 being connected with a wire stretcher of any desired form and indicated generally by the reference character 20. The securing elements 10 fit somewhat loosely in the bearings 7 and in the openings 8 and 9. Consequently, when the chains 17 are put under tension, the flanges 3 and 5 of the angle members 1 and 2 will assume a large, obtuse angle with respect to each other, thereby gripping the wire or fence, indicated at 55, firmly, the greater the tension, the stronger the grip upon the wire or fence. The bearings 7 are not intended as an abutment for the hooks 15 when the nuts 14 are tightened but the pressure is exerted against the flange 3 of the angle bar 1 so that when the hooks 15 are put under tension, the flange 3 is used as the fulcrum which in itself gives a powerful leverage tending to tighten the flanges 3 and 5 on the wire or fence. When the clamp herein disclosed is used in combination with a wire stretching device such as that indicated at 20, the clamp acts as a compound tightening lever of great power.

From the foregoing it will be observed that there is presented in this application, a wire fence clamp of novel and improved form which, in operation, will act automatically to increase the grip upon the fence or wire.

Having thus described the invention what is claimed is:—

1. A wire fence clamp comprising angle members, two of the flanges of the angle members being opposed and two of the flanges of the angle members being approximately alined; a securing element extended loosely through the opposed flanges, thereby to permit the angle members to tilt on the securing element and move the inner edges of the alined flanges toward each other, the securing element having means to engage with the alined flange of one angle member; and movable means upon the securing element for engaging the alined flange of the other angle member.

2. A wire fence clamp comprising angle members, two of the flanges of the angle members being opposed and two of the flanges being approximately alined; a securing element extended through the opposed flanges and having means to engage with the alined flanges, one of the last specified flange-engaging means being adjustable; and means upon the securing element for receiving a stretching device, whereby, when tension is applied to the clamp, the opposed flanges of the angle members will tend to open at their outer edges and to approach each other at their inner edges, thereby increasing the grip of the clamp.

3. A wire fence clamp comprising angle members, two of the flanges of the angle members being opposed and two of the flanges of the angle members being approximately alined; a securing element extended loosely through the opposed flanges and having means to engage with the alined flanges; and means upon the clamp for receiving a stretching device, whereby, when tension is applied to the clamp, the opposed flanges of the angle members will tend to open at their outer edges and to approach each other at their inner edges, thereby increasing the grip of the clamp.

In testimony that I claim the foregoing as my own, I have hereto affixed my signature in the presence of two witnesses.

SAMUEL W. TATE.

Witnesses:
GEORGE B. ROWAN,
BION WALDO.

Copies of this patent may be obtained for five cents each, by addressing the "Commissioner of Patents, Washington, D. C."